July 14, 1931. L. JOHNSON 1,814,513
APPARATUS FOR SHEARING MATERIAL
Filed Feb. 25, 1928 2 Sheets-Sheet 2
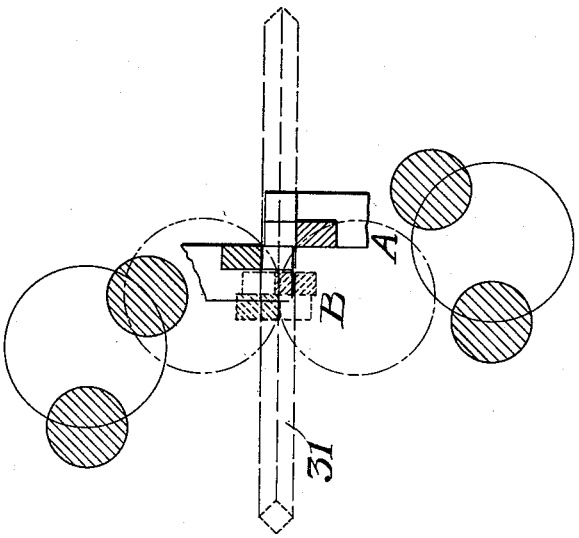
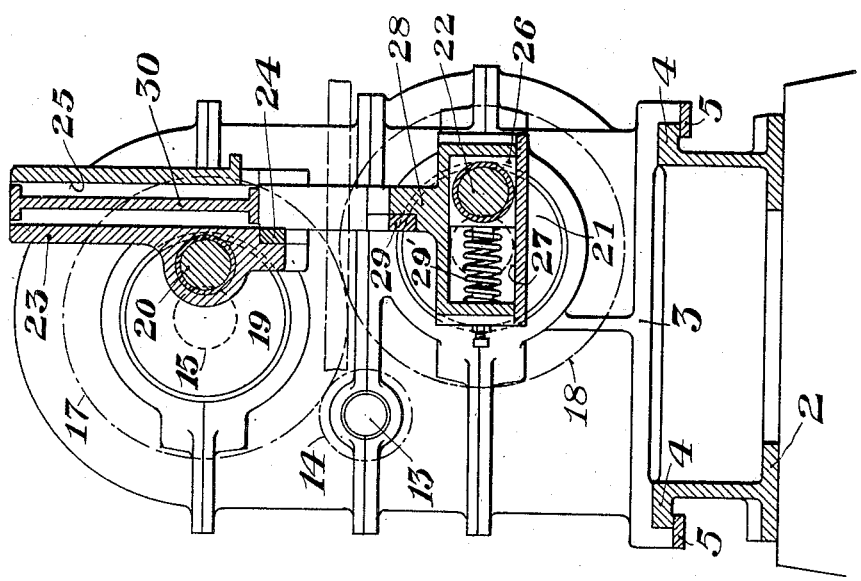
INVENTOR
Lane Johnson Patented July 14, 1931

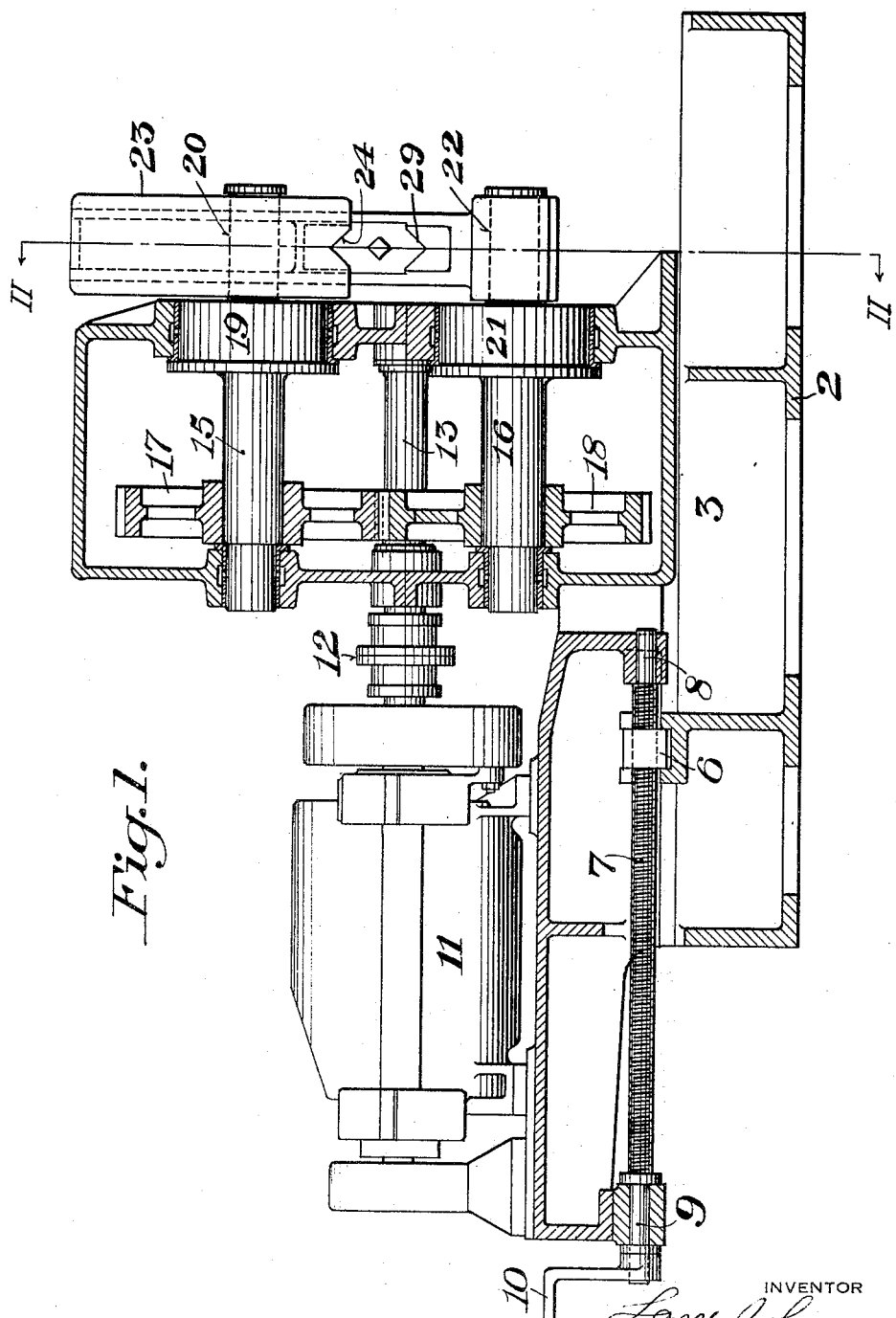

1,814,513

UNITED STATES PATENT OFFICE

LANE JOHNSON, OF INGRAM, PENNSYLVANIA, ASSIGNOR TO UNITED ENGINEERING AND FOUNDRY COMPANY, OF PITTSBURGH, PENNSYLVANIA, A CORPORATION OF PENNSYLVANIA

APPARATUS FOR SHEARING MATERIAL

Application filed February 25, 1928. Serial No. 256,919.

This invention relates to the shearing of material, and more particularly to an apparatus for shearing moving material. It relates still more particularly to that type of shearing mechanism known in the art as moving shears, and is adapted for shearing moving material of any desired cross-sectional shape.

The invention is particularly applicable to the shearing of moving lengths of metal, which may be in the form of plates, sheets, strips, rods, bars, etc. It will be particularly described in a present preferred embodiment as applied to the shearing of bars.

When a moving length of material such as a metal bar is projected in the direction of its axis, it is desirable that such material be severed into lengths while it is still moving and without interfering with or slowing up its motion. This is particularly true of rolled shapes which are formed in rolling mills and which are delivered from a stand of rolls to be sheared. The inherent action of the mill imparts a steady and substantially uniform linear speed to the material. Shears of the moving type have been used heretofore in severing such a moving material as it is delivered from a stand of rolls.

With shears as heretofore known, in spite of the fact that every effort has been made to insure a linear speed of the shear blades at the time of severing the material which is substantially equal to the speed of the material itself, a number of difficulties have arisen. At the time when the shears are caused to move transversely of the material to sever it, there is a tendency for a slight slowing up of their speed due to contact with the material. This sometimes results in buckling of the material, imparts a strain to the shears and interferes with the effective shearing of the material. Furthermore, unless special provision is made for feeding the severed material forward from the shears, such severed material may interfere with succeeding portions of material passing through the shears.

I provide an apparatus for shearing moving material of the nature above described wherein the material as fed to the shearing apparatus is cleanly severed without buckling and without interference between successive portions thereof passing through the shears. I further provide a means assuring complete severance and forward displacement of the portion of the material in advance of the blades in order to avoid the disadvantages above mentioned.

I also provide a shear having a blade member pivotally mounted on a movable pivot constructed so that the mass of the blade member is so distributed with respect to the pivot as to minimize the setting up of unbalanced forces upon movement thereof.

In the accompanying drawings I have shown a present preferred embodiment of the invention wherein Figure 1 is a vertical cross-sectional view through a shearing apparatus;

Figure 2 is a cross-sectional view taken along the line II—II of Figure 1; and

Figure 3 is a diagrammatic illustration of the operation of the shear.

Referring more particularly to the drawings, reference numeral 2 designates generally a base or foundation upon which a shearing apparatus is adapted to be supported. The shearing apparatus comprises a frame 3 slidably supported upon tracks 4 integral with the base 2, the frame 3 having downwardly and inwardly extending projections 5 for insuring positive guidance of the shearing apparatus along the tracks 4. The base 2 is provided with a threaded yoke 6 which receives an adjusting screw 7 journalled in the frame 3 at 8 and 9 and provided with an operating handle 10. The bearings 8 and 9 provide for longitudinal thrust in the direction of the axis of the adjusting screw 7 so that when the handle 10 is rotated the frame 3 will be moved relative to the base 2 along the tracks 4. This provision enables the positioning of the shear in a desired adjusted position so as to operate upon material being positively fed to it.

Mounted upon the frame 3 is a motor 11 whose shaft is connected through a suitable coupling 12 with a shaft 13 mounted in suitable bearings in the frame. Keyed to the shaft 13 is a pinion 14. Also journalled in the frame are shafts 15 and 16. Keyed to the shaft 15 and meshing with the pinion 14 is a gear 17. Keyed to the shaft 16 and meshing with the gear 17 is a gear 18. The gears 17 and 18 are of equal size. It will thus be seen that rotation of the shaft 13 through the agency of the motor 11 causes rotation of shafts 15 and 16 in opposite directions at equal speeds.

On the shaft 15 is a disc 19 carrying a circular hub 20. On the shaft 16 is a similar disc 21 carrying a similar circular hub 22.

Rotatably mounted upon the hub 20 is a blade frame 23. This frame comprises a blade 24 and a guiding channel 25. The guiding channel 25 is adapted to extend in a generally vertical direction and to cooperate with a guide to be presently described.

Rotatably mounted upon the hub 22 is a block 26. This block is adapted to be slidably received within a guide 27 forming a part of the lower blade frame 28. This frame also carries the lower blade 29.

Bearing against a portion of the lower blade frame 28 at one end of the guide 27 and against the block 26 is a spring 29' for a purpose to be presently described. It will be seen that the spring 29' permits sliding movement of the block 26 within the guide 27 but urges the block to the right relatively to the frame 28, viewing Figure 2. The frame 28 is provided with an extension in the form of a guide 30. The guide 30 is adapted to be received within the guide channel 25 and to be slidable therealong. By means of the cooperating guide and guiding channel the two blade frames 23 and 28 are always maintained in the same relative angular position, so that the cooperating blades 24 and 29 will be maintained in shearing relationship.

In operation, the shaft 15 is rotated in a clockwise direction and the shaft 16 in a counter-clockwise direction, and the material is fed to the shear from the right, viewing Figure 2. The respective hubs 20 and 22, which serve as bearings for the blade frames, are positioned on the discs 19 and 21 so that both will reach the extreme right hand and left hand positions in their travel, viewing Figure 2, at the same time. This provision also insures that when the hub 20 is in its extreme lower position, the hub 22 is in its extreme upper position, and vice versa. Rotation of the shaft 13 therefore causes a relative shearing movement of the blades 24 and 29 for each rotation of the shafts 15 and 16. When the shear is operated with no material passing through it, the lower blade frame 28 is maintained in its extreme left hand position relative to the block 26, as shown in Figure 2, and when the parts are in such relative position the shearing motion of the blades is in a vertical direction.

The rotational speed of the shaft 15 is preferably maintained such that the linear speed of the blade 24 in its lowermost position, that is, when it is traveling parallel to the material, is somewhat greater than the linear speed of the material. This would also be the case with the blade 29 except for the provision of the spring 29'. As the blade 29 comes into cutting relationship with the material its contact therewith tends to reduce the speed of the blade to that of the material. For a very small arc in the rotation of the shaft 16, the linear speed of the blade 29 is slowed down due to such contact, and the spring 29' is compressed. This causes a change in the angular position of the blade frames 23 and 28 relative to the frame 3 and to the material, but it does not alter the angular position of the blade frames relative to each other.

The severing of the material is in progress while the blade 29 is traveling at the same linear speed as the material. At the moment when severance of the material is completed, the spring 29' is under substantially its greatest compression, and upon such severance the spring urges the lower blade frame 28, and consequently the lower blade 29, to the left, viewing Figure 2, so as to accelerate its speed in that direction. This acceleration is very rapid and of short duration, lasting only until the end of the frame and the block 26 come in contact. The action, however, is effective for insuring the positive severance of the two portions of the material and for moving the severed portion to the left relatively to the portion following it; that is, the severed portion of the material is caused to move a substantial distance away from the succeeding portion by the action of the shears so that no interference between the two is possible. This insures a clean cutting of the material and a smooth and uninterrupted action of the shears.

During the time when the speed of the blade 29 is being controlled by the material, the angle of the blade frames with respect to the material is slightly altered, as above described. The spring 29' is at such time tending to restore the blade frames to their original angularity respecting the material and at the moment when severance is completed the blade frames 23 and 28 will rotate as a unit, thereby effecting the acceleration of the blade 29.

In the diagrammatic illustration of Figure 3, the blades are shown at A in a position where they are just making contact with the bar 31. Movement to the left from such position effects the cutting of the bar and reduces the linear speed of the lower blade to that of the bar. The blades are shown at B after having severed the material and assumed their normal angular position with respect thereto. Intermediate positions A and B, the blades are slightly displaced angularly as above described. It will be appreciated that such displacement occurs very quickly and during only a very small arc in the rotation of the shears.

The axes of the shafts 15 and 16 are offset horizontally with respect to one another in order that during the shearing stroke the blades will be urged toward one another to minimize any spreading action which might otherwise take place. The stress due to the cutting of the material commences some distance before the blades attain their respective positions of greatest displacement vertically, and during the small angle preceding the arrival of the blades at such position it is desirable that they be substantially in a line joining the axes of the shafts 15 and 16. Thus a thrust is exerted on the blades tending to press them together at the time when the greatest shearing stress takes place.

The mass of the blade frame 23 is so distributed along a vertical plane with respect to its pivot 20 as to minimize the setting up of unbalanced forces upon movement of the pivot substantially in a horizontal direction. There is a tendency for the guide 30 to move out of alignment with the guiding channel 25 of the blade frame, thus increasing the wear on the parts.

This tendency is greatly reduced by disposing a substantial portion of the mass of the blade frame above the pivot 20 so that, with the guide 30 operating in the channel 25, the natural tendency of the frame 23 is more nearly toward simple translatory motion than when the pivot 20 is disposed near the upper extremity of the frame. The setting up of unbalanced forces is thus minimized, whereby wear on the parts is reduced with the consequent provision of a more smoothly running shear.

While I have shown and described a present preferred embodiment of the invention, it is to be understood that the same is not limited thereto but may be otherwise embodied and practiced within the scope of the following claims:

I claim:

1. Shear structure for severing moving material, comprising a base, opposed rotatable supports mounted thereon, and shearing means comprising cooperating blades, one carried by each support, at least one end of said shearing means being movable in the direction of travel of the material and relatively, in such direction, to the other end.

2. Shear structure for severing moving material, comprising opposed rotatable supports, and relatively translatable shear blades carried by the respective supports, a straight line joining the centers of the supports being non-perpendicular to the material being sheared.

3. Shear structure for severing moving material, comprising cutting means, supporting structure therefor, rotatable driving means for opposed portions of the supporting structure, and a resilient connection between one of such portions of the supporting structure and its driving means.

4. Shear structure for severing moving material, comprising opposed relatively movable blades, a guide for said blades, rotatable driving means for the respective blades, and a resilient connection between said guide and a portion of the driving means.

In testimony whereof I have hereunto set my hand.

LANE JOHNSON.